J. F. Troxel,
Hay Fork.

No. 88,593. Patented April 6, 1869.

Witnesses.
J. Snowden Bell
Charles Herron

Inventor.
J. F. Troxel
By D. E. Somes & Co. his attorneys

JACOB F. TROXEL, OF BLOOMVILLE, OHIO.

Letters Patent No. 88,593, dated April 6, 1869.

IMPROVEMENT IN HORSE HAY-FORKS.

The Schedule referred to in these Letters Patent and making part of the same.

*To all whom it may concern:*

Be it known that I, JACOB F. TROXEL, of Bloomville, in the county of Seneca, and in the State of Ohio, have invented a new and useful Improvement in Hay-Elevators; and I do hereby declare that the following is a full, clear, and exact description thereof, reference being had to the accompanying drawings, which make part of this specification, and in which—

Figure 1:
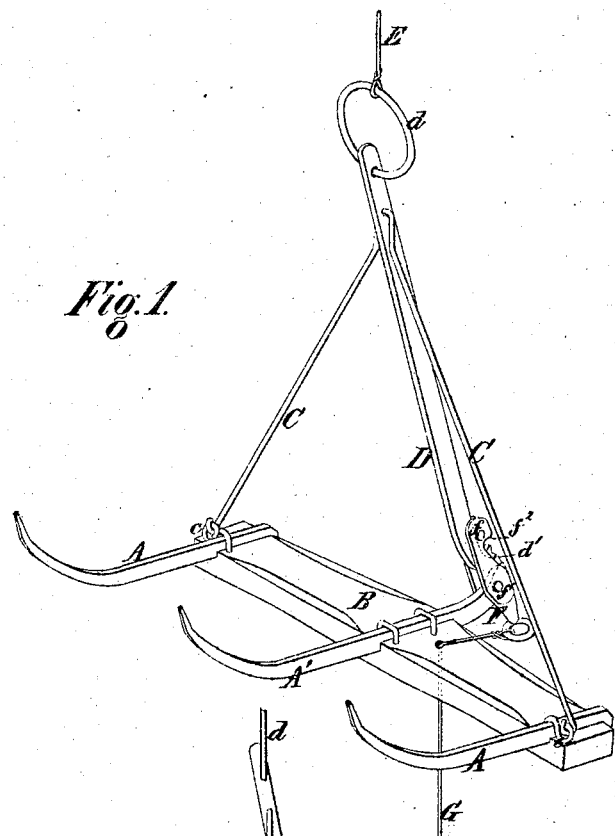
Figure 2:
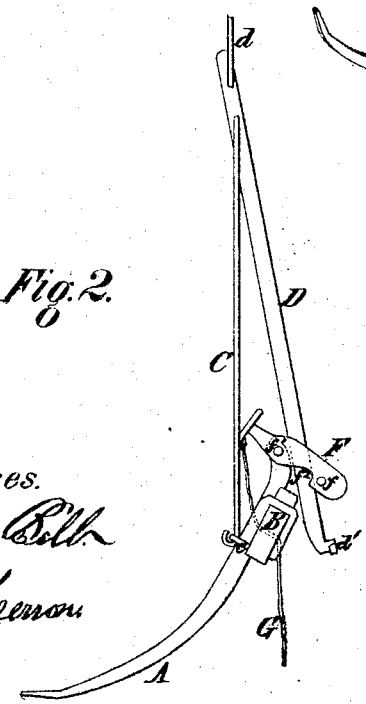

Figure 1 represents a view, in perspective, of my improved hay-elevator, shown as locked, or in position to elevate a bundle of hay; and Figure 2, a side elevation of the same, unlocked, to discharge the same.

The object of my invention is to provide a cheap, simple, and durable hay-elevator, whose parts shall be so constructed and arranged as to be held firmly in position while elevating the hay, and unlocked with ease and certainty when it is desired to drop the same; to which ends—

My improvements consist in a hook, formed of three tines, or prongs, secured to a suitable block, and bent slightly upward toward their points, for the purpose of holding the hay more securely.

The hook is supported by a bent, or A-shaped rod, connected to the block at or near its ends, and pivoted at its top and centre to a long brace, to the upper end of which the hoisting-rope is attached.

When locked, to elevate the hay, the lower end of the brace rests against a pin in a lock-lever, pivoted to the rear of the centre tine, and when, by a suitable movement of this lever, the support is withdrawn, the weight of the tines and the hay upon them brings the hook into proper position to discharge the latter, as hereinafter more fully described.

In the accompanying drawings, which show a convenient arrangement of parts for carrying out the objects of my invention, my elevating-hook is shown, as composed, of three tines, or prongs A A A', secured by screw-bolts, staples, or in other suitable manner, to a block, B.

The tines are bent slightly upward, toward their points, as shown, by which construction they are enabled to hold the hay more securely during its elevation, and, from their shape and position, readily penetrate the same in the mow.

A rod, C, bent into A-shape, is hooked to staples $c$ $c$, at or near the ends of the block B, and upon that side of the same which is next the points of the tines.

This rod is pivoted at its centre to a brace, D, near its upper end, which carries a ring, $d$, to which the hoisting-rope E is attached.

The centre tine A' projects beyond the rear of the block, and is curved upward at its rear end, to which a lock-lever, F is pivoted.

The lever F is composed of two plates, provided with inclined recesses $f^2$, and united by bolts, or pins $f f^1$.

The brace D is made of such length, that when the parts are locked, to raise a bundle of hay, its lower end rests upon the rear of the tine A', and the brace bears, a short distance above its lower end, against the pin $f$ of the lock-lever F.

Additional weight, or pressure upon the tines tends to press the brace more forcibly against the pin, so that there is no risk of the parts becoming unlocked while in operation.

The lower end of the brace D is provided with projections $d'$, which enter the inclined recesses $f^2$, and prevent the brace from swinging in toward the block B.

When it is desired to drop the hay, a pull is given to the unlocking-rope G, attached to the lower end of the lock-lever F, by which the upper end of the same is moved away from the block B, and the bearing-pin $f$ withdrawn from the brace D.

The lower end of the brace being then unsupported, the weight of the tines and the hay upon them causes the hook to assume the position shown in fig. 2, and the bundle of hay readily drops from the tines.

From the position of the parts when unlocked, it will be seen that the hook will easily penetrate the hay, and, as before described, there is no tendency to be accidentally unlocked while being elevated.

The hay is readily discharged by a single pull upon the cord G, and, from the construction of the lock-lever F, it operates with quickness and certainty.

My elevator is of cheap and simple construction, light and durable, and can be easily operated, without liability to derangement.

Having thus fully described my invention,

What I claim therein as new, and desire to secure by Letters Patent, is—

The lock-lever F, constructed as described, in combination with the tine A', lever D, rod C, and block B, the whole constructed, arranged, and operating as set forth.

The above specification signed by me, this 21st day of December, 1868.

J. F. TROXEL.

Witnesses:
   J. R. WILSON,
   ISAAC SEITZ.